July 6, 1948. C. A. BAKER 2,444,489
APPARATUS FOR FREEZING AND STORING FOODS
Filed June 17, 1944 2 Sheets-Sheet 1
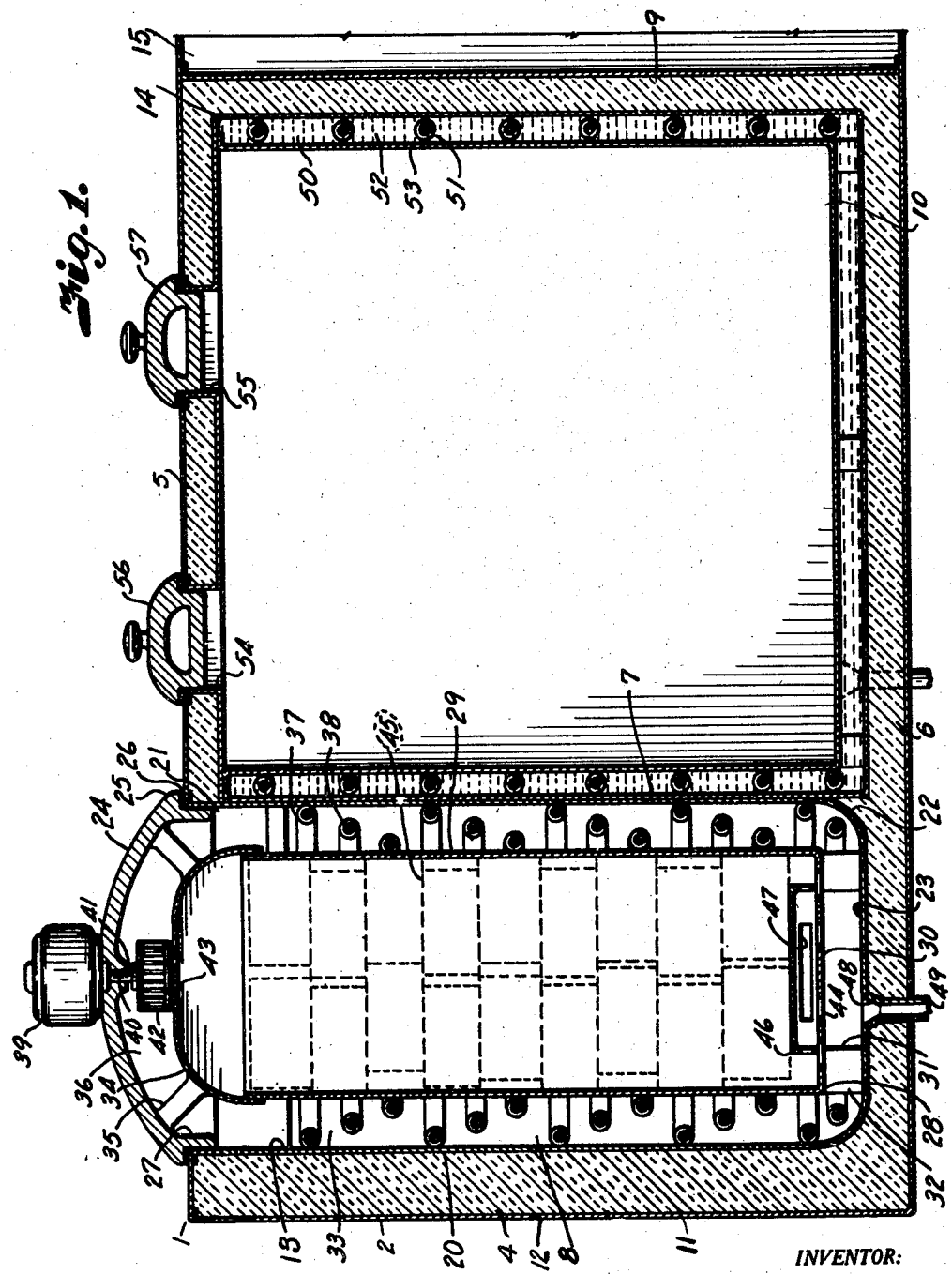
INVENTOR:
Chester A. Baker.
BY
ATTORNEYS.

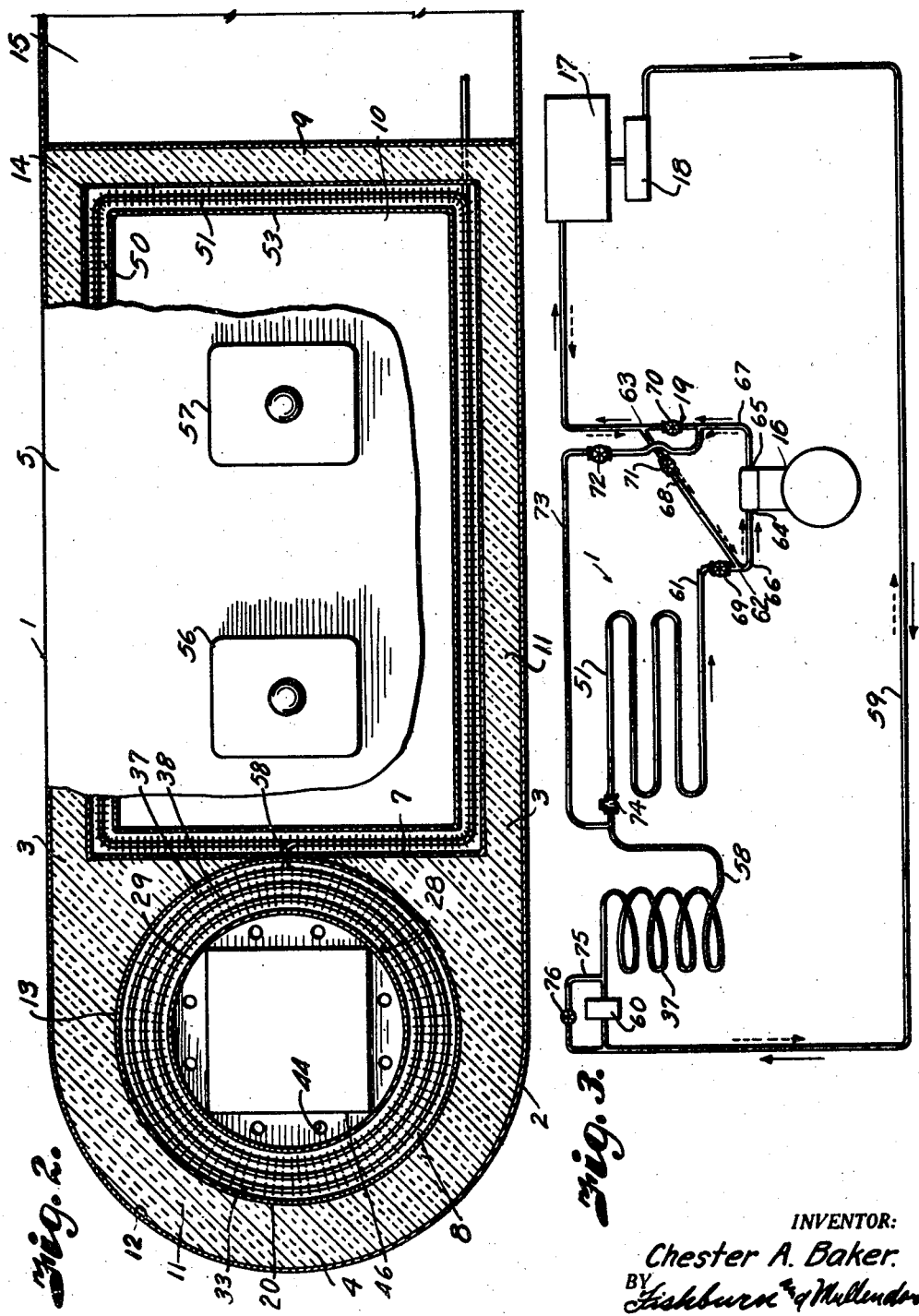

Patented July 6, 1948

2,444,489

UNITED STATES PATENT OFFICE 2,444,489

APPARATUS FOR FREEZING AND STORING FOODS

Chester A. Baker, Glen Ridge, N. J., assignor to Baker Ice Machine Company, Incorporated, Omaha, Nebr., a corporation Application June 17, 1944, Serial No. 540,766

10 Claims. (Cl. 62—102)

This invention relates to an apparatus for quick freezing and storing frozen foods such as meats, poultry, fish, fruits, vegetables, and the like, and has for its principal object to provide an apparatus of this character particularly adapted for home and farm use.

Other objects of the invention are to provide an efficient and economic self-contained freezing and storage unit; to provide rapid heat transfer and freezing of articles by circulating a forced current of air under an excess static pressure in contact with a refrigerating element and then diffusing the highly chilled air through restricted orifices around the articles to be frozen; to provide a freezing and storage unit of simple construction that may be sold at relatively low cost; and to provide a freezing and storage unit wherein the parts are readily accessible and adapted to be readily defrosted by circulating discharged gases from the compressor of the unit through the refrigerating coils thereof.

In accomplishing these and other objects of the invention, I have provided improved details of structure, the preferred form of which is illustrated in the accompanying drawing wherein:

Fig. 1 is a longitudinal vertical section through a quick-freezing and storage unit constructed in accordance with the present invention.

Fig. 2 is a plane view of the unit partly in horizontal section.

Fig. 3 is a diagrammatic view of the refrigerating elements of the freezing and storage compartments, the refrigerant compressor, the condenser, and showing the piping and valve arrangement for effecting defrosting of the refrigerating elements.

Referring more in detail to the drawings:

1 designates a quick-freezing and storage unit constructed in accordance with the present invention and which includes an elongated cabinet 2 having side walls 3, end walls 4, a top 5, and a bottom 6. One of the end walls 4 is preferably semi-cylindrical as shown in Fig. 2 to cooperate with a transverse partition 7 in containing a quick-freezing compartment 8 at that end of the compartment. Spaced from the partition 7 in the direction of the opposite end wall is a transverse partition 9 to provide a storage compartment 10. The outer walls enclosing the compartments 8 and 10 are insulated in accordance with good refrigerating practice as indicated at 11, with the insulation being contained between an outer jacket 12 and inner jackets 13 and 14. The bottom 5 and top 6 are similarly constructed and suitably insulated.

The space in the cabinet between the partition 9 and the adjacent end wall forms a compartment 15 for housing a refrigerating unit including a compressor 16, a condenser 17, a receiver 18, and a valving arrangement 19 indicated in diagram in Fig. 3, and an operating motor (not shown) for the compressor. The outer walls forming the compartment 15 need not be insulated.

The jacket 12 has the vertical wall 20 thereof located substantially concentric with the axis of the semi-cylindrical end wall and extending from an opening 21 in the top 5 to a point near the bottom of the compartment where the wall curves inwardly as at 22 to direct a flow of air as later described and which connects with a bottom 23 as shown in Fig. 1.

The top of the casing is closed by a dome-shaped cover 24 having an annular rim 25 carrying a gasket 26 which sealingly engages the marginal edge of the opening in the top 5. The cover also has a depending annular flange 27 engaged within the open top of the casing. Mounted within the casing is an article container 28 including a vertical wall 29 concentric with the wall 20 and having a bottom 30 spaced above the bottom 23 by suitable feet 31 to provide a passageway 32 thereunder which is connected with an annular passageway 33 provided between the walls 20 and 29. The upper end of the cylindrical wall 29 terminates short of the upper end of the casing and is closed by a substantially dome-shaped cap 34 that is connected with the cover 24 by ties 35 whereby a fan compartment 36 is formed therebetween. The fan compartment is connected with the upper end of the circumferential passageway 33. Mounted within the passageway 33 and extending preferably the full height of the article container is a refrigerating element 37 preferably consisting of a plurality of convolutions 38 having differential diameters whereby one convolution is staggered with respect to the adjacent convolutions to provide a tortuous movement of air downwardly through the passageway 33 and assure direct contact by the air with each convolution for promoting heat transfer therebetween as later described.

Carried by the cover 24 on the exterior side thereof is a motor 39 having a shaft 40 suitably journalled in an opening 41 in the cover and projecting into the fan compartment for mounting a fan 42. The fan 42 may be of any suitable design, for example the sirocco type illustrated and arranged to draw air from the article compartment through an opening 43 in the top thereof. The fan discharges the air circumferentially of the fan compartment for downward flow through the passageway 33 in contact with the refrigerating coils, the air being discharged at substantial velocity and pressure so as to create a pressure within the space 32 below the article compartment where the air under pressure is distributed through a plurality of apertures 44 for upward flow in and around the articles to be frozen. The apertures 44 are suitably restricted in size and number so that the static pressure of the return air inside the article compartment will be slightly less than the air pressure existing in the passageway 33. The reduction of air pressure through the apertures 44 will further reduce slightly the temperature of the chilled air flowing from the passageway 33 and will also insure a substantially uniform diffusion of air in all parts the article compartment.

In order to prevent closing of the apertures 44, the articles to be frozen, indicated by the dotted lines 45, are supported therefrom on a base 46 having air inlets 47 in the sides thereof. The bottom 23 is provided with a suitable drain 48 that is connected with a pipe 49 extending through an opening in the bottom 6 of the cabinet.

Located within the storage compartment and lining the walls and bottom thereof, is a coil chamber 50 adapted to contain a refrigerating coil 51, and if desired, a suitable transfer fluid 52 such as a brine solution so as to promote heat transfer between the coil and the inner walls 53 of the coil compartment. The articles stored are inserted through suitable openings 54 and 55 in the top 5 and normally closed by insulated covers 56 and 57. The refrigerating coils just described are shown diagrammatically in Fig. 3, and may be connected in series as indicated at 58 with one end of the coil 37 located in the quick-freezing compartment. The opposite end of the coil 37 is connected with the liquid receiver 18 through a pipe 59 having a suitable expansion valve 60 therein as in conventional refrigerating practice. The discharge end 61 of the coil 51 is connected by pipes 66 and 67 with the intake and discharge connections 64 and 65 of the compressor 16, the pipe 67 being connected through a pipe 68 having connection at 62 with the pipe 66 and at 63 with the pipe 67. Connected in the pipe 66 between the connection 62 and the terminal 61 of the coil 51 is a control valve 69, and connected in the pipe 67 between the connections 63 and the discharge connection of the compressor is a valve 70. The valves 69 and 70 cooperate with a valve 71 in the pipe 68 and with a valve 72 in a pipe 73 which connects the coil connecting pipe 58 with the pipe 67 to control flow of the refrigerant as later described, the connection for the pipe 73 being located between the discharge connection 65 of the compressor and the valve 70 as shown in Fig. 3. A check valve 74 is inserted between the connection of the pipe 73 and the inlet of the core 51.

The expansion valve 60 is provided with a bypass 75 having a control valve 76 therein. When the refrigerating unit is in normal operation the valves 71, 72, and 76 are closed and the valves 69 and 70 are open so that refrigerant discharged by the compressor 16 is delivered as a hot gas through the pipe 67 to the condenser 17 in which the gas is condensed and the liquid collected in the receiver 18. The liquefied refrigerant then flows through the pipe 59 and is expanded into the coil 37 at a pressure set by the expansion valve 60 whereby the refrigerant in expanding takes up heat from the air circulated within the freezing compartment. The expanding refrigerant then passes through the connection 58, check valve 74, and refrigerating coil 51 of the storage compartment and is returned through the pipe 66 to the inlet connection 64 of the compressor.

In using the unit, the articles or foodstuffs to be frozen are preferably wrapped and stacked within the article container as shown in dotted lines in Fig. 1, the articles being inserted upon removal of the cover 24 which, of course, effects removal of the cap 34 since it is connected therewith.

When the container 28 is filled with articles to be frozen, the cover 24 is re-applied. The motor 39 is then started to cause the fan 42 to begin circulation of air from the upper end of the article container 28, the air being discharged by the fan 42 for downward flow through the annular passageway 33 into heat exchange relation with the refrigerating coil 37. Expansion of the refrigerating medium within the coil reduces the temperature of the air moving in contact therewith so that when the air reaches the space 32 it is in highly chilled condition for discharge through the apertures 44 for diffusion in and around the articles contained in the article compartment. The cold air in moving over the surface of the articles absorbs heat therefrom and effects rapid chilling and freezing thereof. The air, after contacting the articles, is again drawn through the opening 43 and recirculated by the fan. Increased heat exchange capacity is obtained by effecting an appreciable velocity of air through the passageway 33 and through the article compartment.

When the articles are frozen the cover 24 is removed and the articles in the freezing container are removed and placed within the storage compartment through the openings 54 and 55. The articles may be arranged in any suitable manner in the storage compartment. When the freezing compartment is emptied it is ready to receive additional articles to be frozen.

When it becomes necessary to remove frost from the coils within the freezing compartment the valves 69 and 70 are closed and the valves 71, 72, and 76 are opened. With the compressor in operation hot gases are discharged from the compressor through the pipe 67 and diverted through the pipe 73 by the valve 70 for reverse flow through the refrigerating coil 37, bypass 75, and through the pipe 59 to the intake of the compressor by way of the liquid receiver 18, condenser 17, and cross pipe 68 to the intake of the compressor, the hot gases upon passing through the coil 37 heat the coil sufficiently to melt the frost therefrom. Attention is directed to the fact that during this cycle the storage coil 51 is isolated by the check valve 74 and valve 69 so as to permit defrosting of the freezing compartment without heating up the storage compartment. Any water which may accumulate in the bottom of the compartments is withdrawn through drains 48.

From the foregoing it is obvious that I have provided a quick-freezing and storage unit that is of simple, relatively inexpensive construction and which is especially adapted for the small user particularly in homes, farms, and other places where it is desired to preserve foods by quick-freezing and cold-storage process.

What I claim and desire to secure by Letters Patent is:

1. In an apparatus of the character described, a quick freezer including an article container having an opening in the top and a perforated bottom, a refrigerating element surrounding said container intermediate said opening in the top and the perforated bottom, means for withdrawing air from the container through the top opening and discharging the air downwardly under substantial velocity into contact with the refrigerating element, and means for diverting the air for discharge into the container through the perforations of the container bottom.

2. In an apparatus of the character described, a cabinet having a quick-freezing compartment, an article container in the compartment and spaced from walls of the container to form an annular passageway around said container, said container being of a size to leave an air space above and below said container and having an outlet in the top and an inlet in the bottom thereof in connection with said annular passageway through said spaces, a refrigerating element in the annular passageway, and means for drawing air through the top opening and discharging the withdrawn air into the top space for direct heat exchange contact with the refrigerating element to cool the air and force the cooled air under pressure through the inlet in said bottom.

3. In an apparatus of the character described, a cabinet having a quick-freezing compartment, an article container in the compartment and spaced from a wall of the compartment to form an annular passageway around said container, said container having space above the top and below the bottom and having an outlet in the top and an inlet in the bottom in connection with said passageway through said spaces, a refrigerating means in the passageway intermediate said spaces, and means for withdrawing air from said outlet of the container and passing the air downwardly in heat exchange contact with the refrigerating means, said inlet of the container comprising a plurality of openings of a size relative to capacity of said circulating means to build up a pressure in said passageway and to effect diffusion of the air into the container.

4. In an apparatus of the character described, a cabinet having a quick-freezing compartment, an article container in the compartment and spaced from walls of the container to form a circulating passageway around said container, said container having an outlet in the top and an inlet in the bottom thereof in connection with said passageway, a refrigerating element in the passageway including a plurality of coils with the coils of different diameter and being spaced to form tortuous passage for air moved through the passageway, and means for circulating air to and from said container in moving contact with the refrigerating element.

5. In an apparatus of the character described, a cabinet having a quick-freezing compartment and an opening in the top of the cabinet for giving access to said compartment, a container in the compartment having an opening in the upper end coaxial with said opening in the cabinet and having walls spaced from corresponding walls of the compartment for providing an air circulating passageway, a cover for the cabinet opening, a cover for the open end of the container and having an opening therein through which air is adapted to be withdrawn from the container, means interconnecting said covers, a fan supported between the covers for drawing air from the container through said opening and for discharging the air through the passageway, and a refrigerating element in the passageway for cooling the air, said bottom of the container having inlet openings for the cooled air.

6. In an apparatus of the character described, a cabinet having a quick-freezing compartment and an opening in the top of the cabinet for giving access to the compartment, a container insertable into the compartment through said opening and having walls spaced from corresponding walls of the compartment for providing an air circulating passageway, a cover for the cabinet opening, a cover for the upper end of the container and having an opening therein through which air is adapted to be withdrawn from the container, means interconnecting said covers, a fan supported between the covers for drawing air from the container through said opening and for discharging the air through the passageway, a refrigerating element in the passageway for cooling the air, and means for diffusing the cooled air upwardly through the bottom of the container.

7. An apparatus of the character described including, a cabinet having a quick-freezing compartment and an opening in the top of the cabinet for giving access to said compartment, a container in the compartment having an opening in the upper end coaxial with the opening in the cabinet and having walls spaced from corresponding walls of the compartment for providing an air circulating passageway, a cover for the cabinet opening, a cover for the open end of the container and having an opening therein through which air is adapted to be withdrawn from the container, and a fan supported by one of said covers for withdrawing air from the container through said opening and for discharging the air through the passageway for return to the container.

8. In an apparatus of the character described, a quick freezing container for articles to be frozen, an outer casing having walls spaced from corresponding walls of the container to provide an air circulating passageway surrounding the container, said container having an opening connecting the interior of the container with said passageway, means for withdrawing air from the container through said opening and discharging the air under pressure into the passageway, a refrigerating element in the passageway for cooling the air discharged into said passageway, means for selectively circulating a warm and a cold refrigerant through the refrigerating element to cool the air at times and to heat the air at other times when the apparatus is in operation, and air inlet means in said container remote from the outlet opening and having a restricted capacity to retard flow of air from said passageway into the container to prolong contact of the air with the refrigerating element for promoting the heat exchange between the refrigerating element and said air prior to inlet of the air into said container.

9. In an apparatus of the character described, a casing having a compartment provided with a circumferential wall rounding into a bottom of said compartment, a dome-shaped top closing the opposite end of the compartment, a quick freezing container having a circular wall spaced from the wall of the compartment to provide an annular air passageway surrounding the container and having a bottom spaced from the bottom of the container, a dome-shaped top for the container and cooperating with the dome-shaped top of the compartment to provide a passageway therebetween curving into the annular passageway, said dome-shaped top of the container having an opening, a fan for drawing air from the container through said opening and discharging the air circumferentially of the last named passageway for distribution of said air to the annular passageway, a refrigerating element in the annular passageway for cooling said air, said bottom of the container having restricted inlet from the annular passageway for restricting flow of air from the annular passageway into the container, and means for supplying a refrigerating medium to the refrigerating element.

10. In an apparatus of the character described, a casing having a compartment provided with a circumferential wall rounding into a bottom of said compartment, a dome-shaped top closing the opposite end of the compartment, a quick freezing container having a circular wall spaced from the wall of the compartment to provide an annular air passageway surrounding the container and having a bottom spaced from the bottom of the container, a dome-shaped top for the container and cooperating with the dome-shaped top of the compartment to provide a passageway therebetween curving into the annular passageway, said dome-shaped top of the container having an opening, a fan for drawing air from the container through said opening and discharging the air circumferentially of the last passageway for distribution of said air to the annular passageway, a refrigerating element in the annular passageway including a plurality of coils of different diameter and spaced to provide a tortuous passageway for said air, said bottom of the container having restricted inlet from said annular passageway for restricting flow of air from the annular passageway into the container, and means for supplying a refrigerating medium to the refrigerating element.

CHESTER A. BAKER.

REFERENCES CITED

The following references are of record in the file of this patent:

UNITED STATES PATENTS

| Number | Name | Date |
| --- | --- | --- |
| 1,075,126 | Scharde | Oct. 7, 1913 |
| 1,601,445 | Hilger | Sept. 28, 1926 |
| 1,679,656 | Gearhart | Aug. 7, 1928 |
| 2,241,558 | Read | May 13, 1941 |
| 2,311,000 | Smith | Feb. 16, 1943 |